Dec. 17, 1968     A. M. MARKS     3,417,267
HEAT-ELECTRICAL POWER INTERCONVERSION DEVICES
Filed Oct. 2, 1964     5 Sheets-Sheet 1
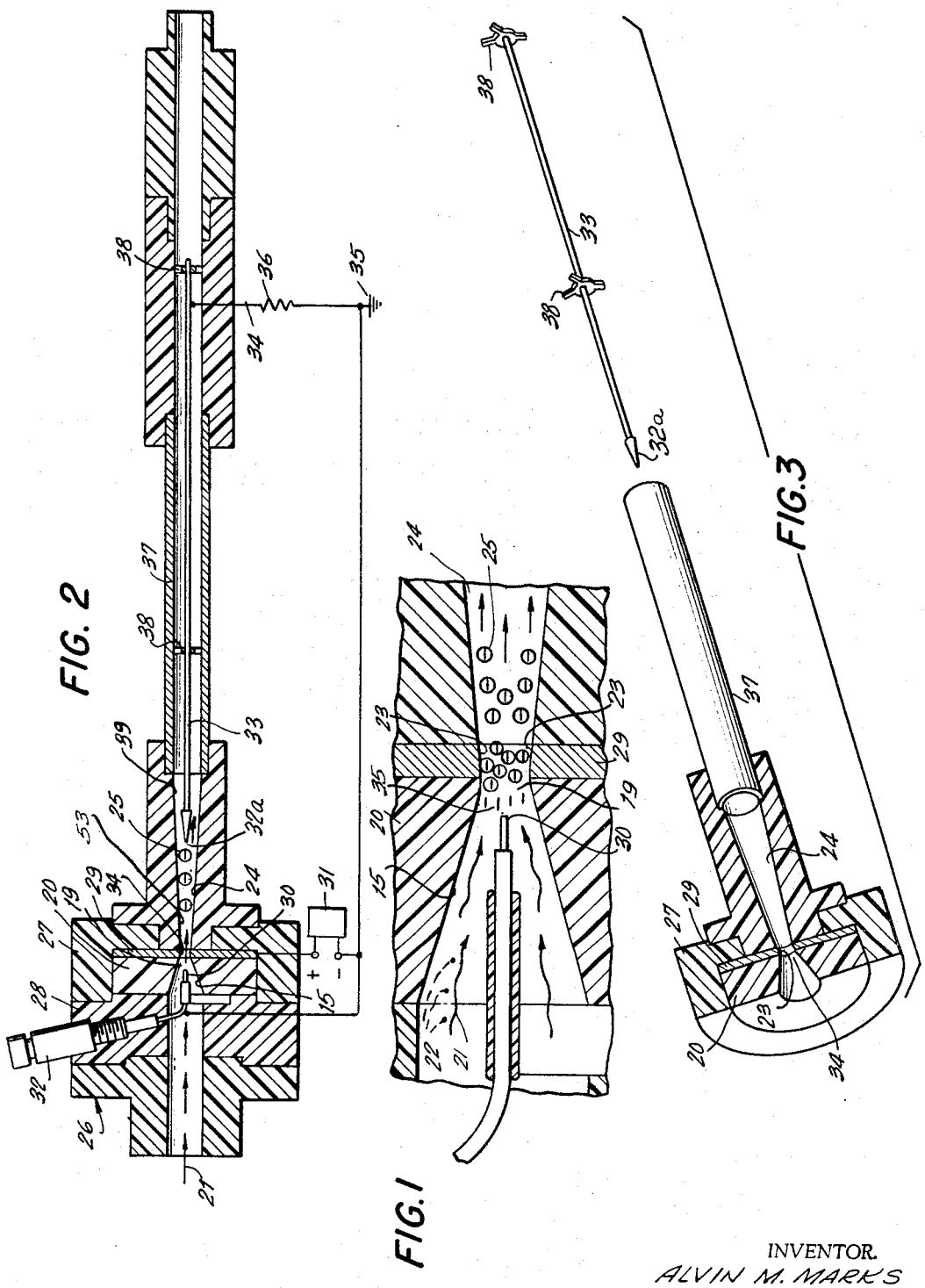
INVENTOR.
ALVIN M. MARKS
BY Albert F. Kronman
ATTORNEY Dec. 17, 1968    A. M. MARKS    3,417,267
HEAT-ELECTRICAL POWER INTERCONVERSION DEVICES
Filed Oct. 2, 1964    5 Sheets-Sheet 2
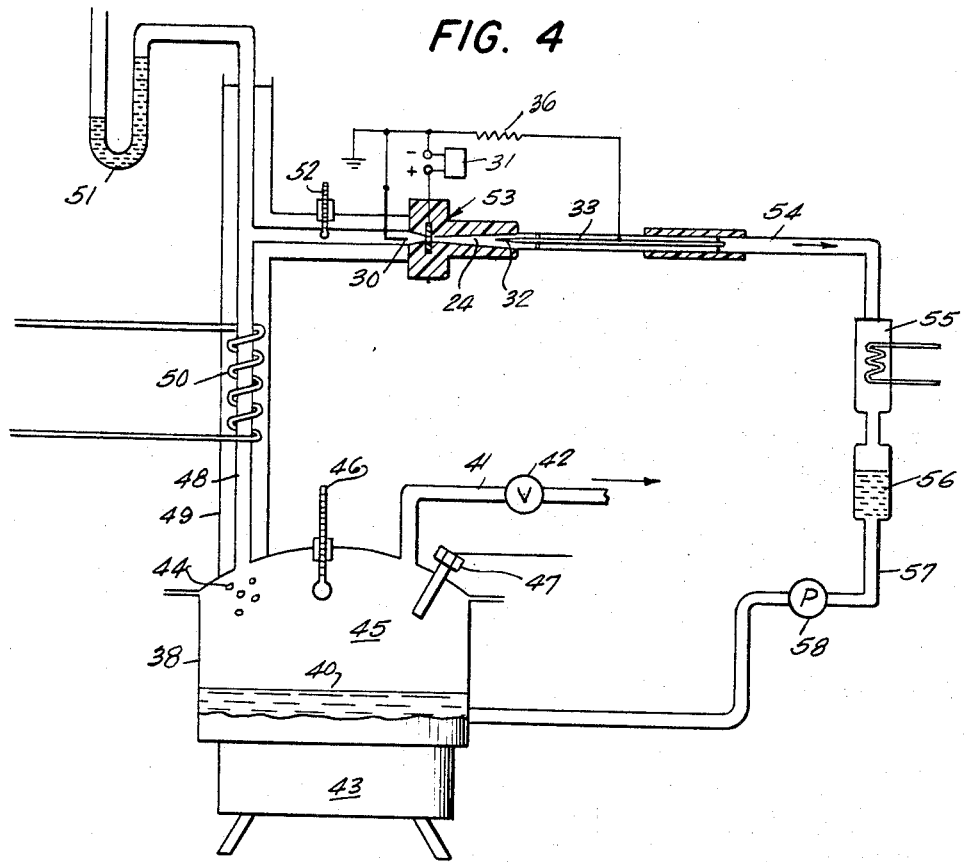
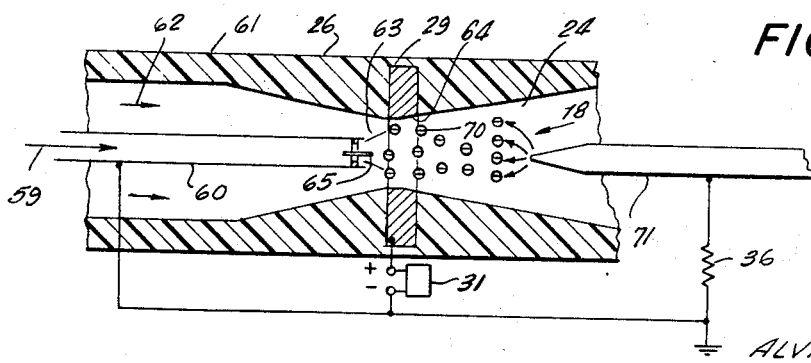
INVENTOR.
ALVIN M. MARKS
BY Albert F. Kronman
ATTORNEY Dec. 17, 1968 A. M. MARKS 3,417,267
HEAT-ELECTRICAL POWER INTERCONVERSION DEVICES
Filed Oct. 2, 1964 5 Sheets-Sheet 3

INVENTOR.
ALVIN M. MARKS
BY Albert F. Kronman
ATTORNEY

Dec. 17, 1968  A. M. MARKS  3,417,267
HEAT-ELECTRICAL POWER INTERCONVERSION DEVICES
Filed Oct. 2, 1964  5 Sheets-Sheet 4

INVENTORS
ALVIN M. MARKS
BY *Albert F. Kronman*
ATTORNEY

United States Patent Office 3,417,267
Patented Dec. 17, 1968

3,417,267
HEAT-ELECTRICAL POWER INTERCONVERSION
DEVICES
Alvin M. Marks, 153—16 10th Ave.,
Whitestone, N.Y. 11357
Filed Oct. 2, 1964, Ser. No. 401,142
20 Claims. (Cl. 310—6)

ABSTRACT OF THE DISCLOSURE

Apparatus and method for converting the heat-kinetic power of a charged aerosol gas into electrical power in which a mixture of a gas and a condensable vapor is made to condense in a corona field to form a charged aerosol having droplets of low mobility and submicron radius. The charged aerosol is directed through a nozzle downstream of the corona field into a conversion chamber against a high intensity force field where it is discharged by a charge collector to change the heat/kinetic power of the gas into electrical power. The methods of forming the charged aerosol in the corona field by condensation provide a useful working substance.

---

This invention relates to power conversion devices, and more particularly it is concerned with heat-electrical power interconversion devices in which a charged aerosol is used as a working medium.

The direct conversion of heat energy into electrical energy through the medium of a charged aerosol was described in U.S. Patent No. 2,638,555, issued on May 12, 1953, to Alvin M. Marks. In this patent, particles of a preformed aerosol contained in a moving gas, are charged by the diffusion of ions produced by a corona field. The charged aerosol particles have a very small mobility compared to gas ions. The charged aerosol stream encounters the repelling effect of a self-generated space charge field whereupon the charged aerosol particles and the gas in which they are suspended are slowed appreciably. The heat-kinetic power of the moving aerosol gas is thus transduced into electrical power which is supplied to a load from a collector electrode at the end of the conversion region.

Described herein is a novel method for simultaneously and efficiently forming and charging an aerosol for use in a generator, pump or thrustor. The charged aerosol is formed continuously in a moving gas by the condensation of a vapor upon ions produced by a corona within the vapor. In an illustrative embodiment of the present invention superheated steam is cooled by expansion in the field of a corona discharge to cause a condensation of charged water droplets of submicron size in the steam upon ions from the corona field, thereupon forming a charged aerosol. There is also provided herein a power conversion device in which the change in the heat-kinetic power of a charged aerosol gas is directly extracted as electrical power.

The term ions as used herein refers to charged particles such as free electrons, or atoms or molecules with one or more negative or positive charges.

A primary object of this invention is to provide a power conversion system for efficiently converting heat-kinetic power into electrical power, or vice versa.

Accordingly, it is an object of the present invention to efficiently form and charge an aerosol for the direct conversion of the heat-kinetic power of a gas into electrical power, or vice versa, for use in a generator, pump or thrustor.

Another object of the present invention is to provide an efficient process for simultaneously forming and charging an aerosol by condensation of a vapor upon gaseous ions or electrons from a corona source, thus creating charged liquid droplets of optimum submicron radii.

Still another object of the invention is to provide a method for efficiently forming a charged aerosol by cooling a vapor below its condensation temperature in the vicinity of ions or electrons formed by a corona discharge.

Another feature of the invention is the formation of a condensation aerosol comprising charged droplets by mixing a condensable vapor with a cooling gas in the vicinity of a stream of ions or electrons.

Among the other features of the present invention is the use of a superheated vapor as a carrier gas in a condensation aerosol power conversion device.

A further object of the invention is to efficiently form a charged aerosol by cooling steam by expansion in the vicinity of a stream of ions or electrons from a corona field.

Another object of the invention is to provide a power conversion device employing a moving charged aerosol as the working medium operating at high pressures with or without a proportion of electron attaching gas component to increase the electric field intensity at which spark breakdown of the aerosol occurs.

A feature of the present invention is the use of a collector electrode positioned within the conversion area spaced from the walls to increase working electrical potential difference of the device before electrical breakdown occurs. This collector electrode may be positioned axially within a circular section, or linearly along a central plane between airfoil sections.

An additional feature of the invention is the successive extraction of electrical power from a moving gas stream.

An object of the present invention is the specification of operating parameters for efficient conversion and minimal frictional power loss such as density, gas-aerosol velocity, molecular weight, electrical breakdown strength, and length of the conversion space.

Another object of the present invention is to minimize frictional power loss by using an airfoil section.

The foregoing and other objects, features and advantages of the invention will be apparent from the following more particular description of the preferred embodiments of the invention, as illustrated in the accompanying drawings.

In the drawings:

FIGURE 1 is a fragmentary view in longitudinal section of a nozzle element greatly enlarged showing the formation of a charged aerosol.

FIGURE 2 is a longitudinal section of the power conversion device of the present invention.

FIGURE 3 is a partially exploded view to show the conversion section of the device.

FIGURE 4 is a somewhat diagrammatic view of a complete electrodynamic cycle according to the present invention.

FIGURE 5 is a schematic illustration of another embodiment of the power conversion device of the present invention for emitting a condensable vapor in the vicinity of a corona discharge in the gas stream.

Figure 12:
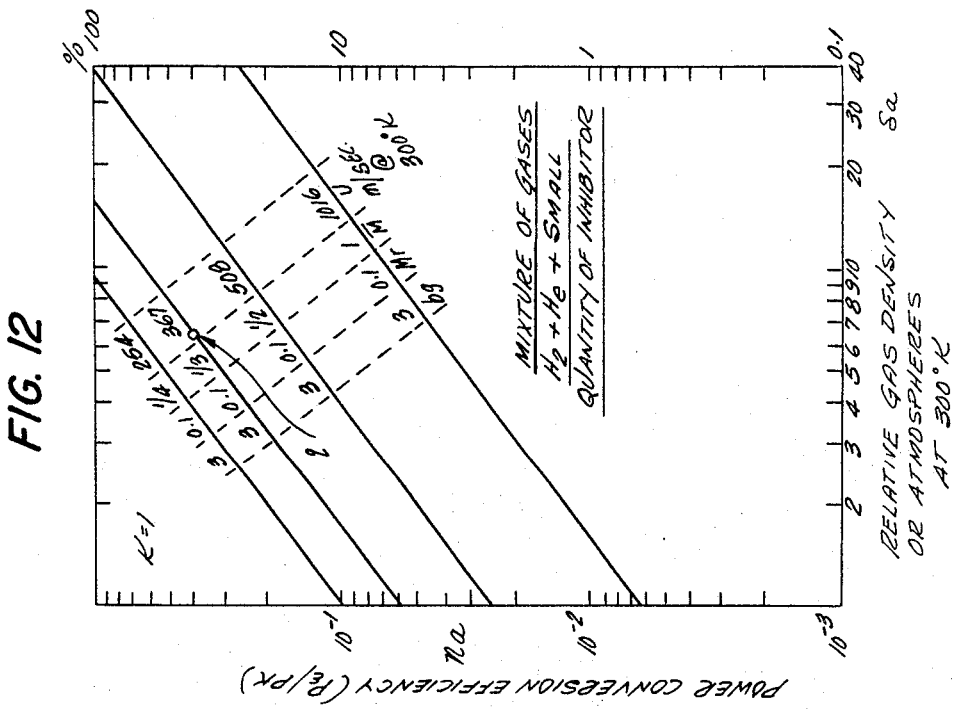
Figure 11:
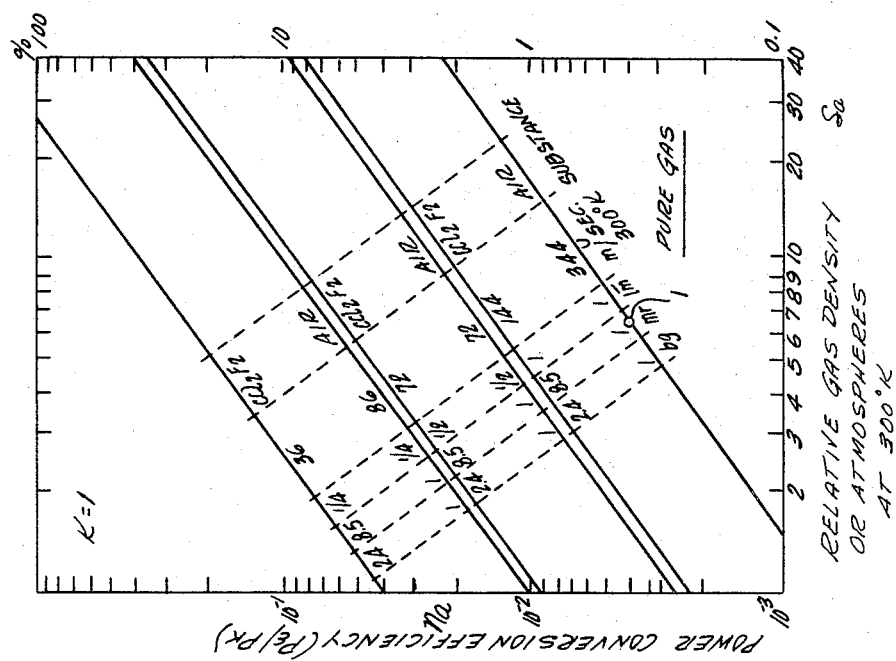

For power conversion devices according to the present invention, FIGURES 11 and 12 are graphs of the conversion ratio of electric power to kinetic power vs. relative gas density showing the effect of variation of the relative electric breakdown strength, relative molecular weight and Mach number for various gases and mixtures of gases.

The condensation aerosol generator

Referring now to the drawings and more specifically to FIGURES 1–3, 15 represents the converging portion of a nozzle 20 and 53 the diverging portion of the nozzle made of electrically insulating material such as Teflon or quartz.

A stream of gas 21 containing a condensable vapor 22 is admitted into nozzle 20 at a suitable velocity in the direction of the arrows shown in FIGURES 1 and 2. Suitable gases include hydrogen, helium, air, nitrogen, argon, freon, nitric oxide, and the like, as well as vapors of water, alcohol, ketone, glycerol, Freon 72, diphenyl chloride, formamide and the like. The condensable vapor 22 may be that of a liquid such as for example water, alcohol, ketone, glycerol, sulfuric acid and the like or materials which are solid at room temperature but which become liquid and then vapor as the temperature increases; as for example, mercurous chloride; elemental metals such as sodium, potassium, rubidium, gallium and mercury, or alloys such as Wood's metal and NaK eutectic. The reactive metals are used only with an inert gas or vapor.

Referring to FIGURE 1, a corona field is established in the region 19 at the entrance to the throat of nozzle 20. The corona field is produced by an electric potential difference between the corona point (or wire) source 30, and the charging electrode 29, the opening 23 of which also forms part of the throat of the nozzle 20. The ionizer 30 comprises a point or wire made of a suitable metal such as tungsten or the like. The distance between charging plate opening 23 and ionizer point or wire 30 is of the order of 1–5 mm. A voltage source 31 establishes a potential difference, usually about 1 to 5 kv., between the ionizer point 30 and the charging electrode at the charging plate opening 23, causing a corona discharge in the vicinity of the condensable vapor stream at 19. The distance of ionizer point 30 from the charging plate opening 23 may be adjusted by screw 32 which is mounted in supporting disc 28. The ionizer 30 may be grounded.

The electric field intensity in the region 19 is sufficient to cause extensive corona ionization without electrical spark breakdown through the gas stream. Electrons or ions, represented by the small minuses, are produced in the gas stream.

FIGURES 1 and 2 show a gas stream 21 entering nozzle 20, converging and passing through plate opening 23, and diverging in the conversion space 24. The condensable vapor is cooled by expansion to a temperature at which condensed charged droplets of submicron size are formed in the corona discharge region 19, each upon a single charge comprising an electron or a negative ion. The charged aerosol droplets thus formed have a radius of the order of 20–200 A, and a mobility of the order of $10^{-5}$ to $10^{-7}$ m.$^2$/volt-sec.

Referring now to FIGURE 2, there is shown in longitudinal section a power conversion device for converting the heat-kinetic power of a charged aerosol into electrical power, carried within a housing 26. The housing 26 comprises a supporting disc 28 for the corona point, a flange member 27 containing the converging inlet portion of the nozzle 20, the charging plate electrode 29, and the diverging portion of the nozzle constituting the conversion space 24.

In the embodiment shown in FIGURE 1, the charging plate 29 is a disc of electrically conducting material such as stainless steel, having a central opening 23 at the throat of the nozzle. The gas velocity increases at the throat because the cross section of the nozzle decreases to a minimum at the throat.

The International System of Units (MKS–° K.) is used herein. It is convenient to refer to measurements of temperature, pressure and gas density relative to that of air under standard conditions. For convenience, standard conditions for a gas or vapor are herein defined as a temperature of 300° K. and a pressure of $10^5$ newtons/m.$^2$, rather than the awkward unit of 1 atmosphere—$1.01 \times 10^5$ newtons/m.$^2$. The unit temperature is defined as 300° K.; for example $T_a = 2$ is 600° K. Relative gas density $\delta_a$ is defined for any gas or vapor as the ratio of gas density under given temperature and pressure to the gas density under standard conditions. For any gas or vapor under given conditions of temperature and pressure, the gas density varies as $m_r$, in which $m_r$ is the ratio of the atomic or molecular weight of the gas to the mean molecular weight of air = 28.8.

A current of approximately 200 microamperes was obtained from a single corona point at incipient electric breakdown, with charged aerosols comprising air-water and steam-water, at a velocity in the range of 300–500 m./sec., and a relative density $\delta_a$ of approximately 4.5. The maximum current varied linearly with the gas density at incipient electrical breakdown between electrodes. In air moving at the same velocity without aerosol formation, under standard conditions, only about 10–15 microamperes are obtainable, while only 45–60 microamperes may be obtained at a relative density of 4.5.

The greatly increased current emitted from a corona point during the formation and charging of an aerosol in a moving gas is a new effect which may be explained as follows: Electrons or negative ions emitted from the corona are captured by the condensation of vapor about each ion, thus forming a charged liquid drop. When this occurs the radius of the charged particle is greatly increased and consequently the mobility of the electron or negative ion is decreased drastically. The negative ion is now enveloped in a liquid droplet which is carried away by the gas stream, thus reducing the limiting space charge effect in the vicinity of the corona wire. In a gas without the formation of a charged aerosol, the space charge effect limits the corona current obtainable from a point source.

There has thus been provided a new efficient method of simultaneously forming and charging a moving aerosol. The current between the corona point 30 and the charging electrode plate 29 is usually less than 1% of the current carried downstream to the colletcor electrode 33. In fact, in most cases the current is less than 0.1% of the current downstream through the converter space. Moreover, the voltage required at the charging plate is ordinarily less than 10% of that acquired by the collector electrode. Therefore, the power required to charge the aerosol by this method is of the order of $10^{-3}$ to $10^{-5}$ of the output power supplied to the load.

Figure 6:
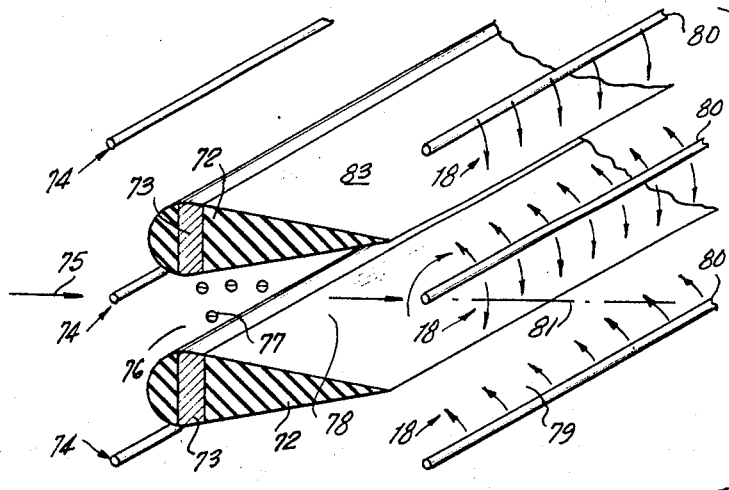
FIGURE 6 is a somewhat isometric fragmentary view of a portion of the power conversion device of the present invention employing an airfoil section.
Figure 7:
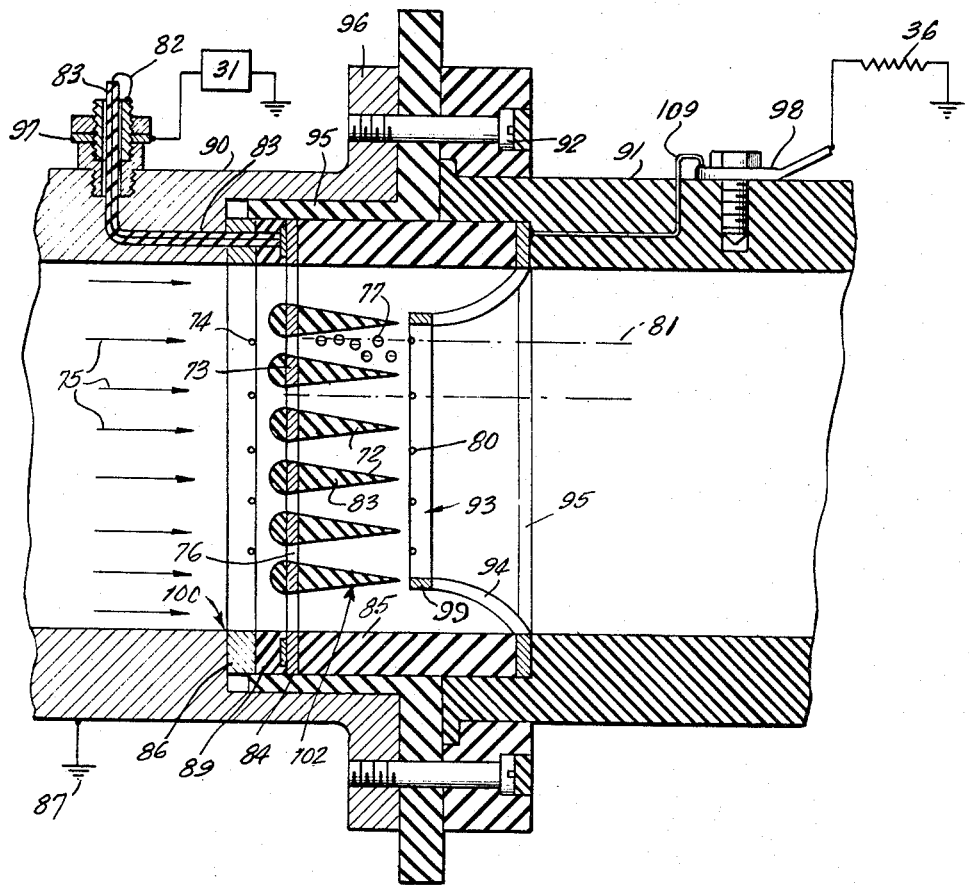
FIGURE 7 is a detailed view of an airfoil section shown in FIGURE 6, partly in section.

After the charged aerosol has been formed in the vicinity of the corona discharge, the charged aerosol flows into the conversion space generally indicated at 24 in FIGURE 2. The charged aerosol builds up a space charge field as described in Patent No. 2,638,555. The peak potential of the space charge field is somewhat greater than the potential of the collector electrode 33. For example, the peak potential of the space charge field just before the collector electrode may be −53 kv. while the potential at the collector may be −50 kv. Under these conditions a positive corona discharge occurs from the collector electrode and positive ions are emitted into the negatively charged aerosol, intermixing with it, and neutralizing the charged aerosol particles. The positive corona discharge 18 is illustrated by arrows in FIGURES 5 and 6. When the gas or vapor carrying the charged aerosol particles is just above the saturation, the charged droplets are stable, but may evaporate when neutralized.

The charged aerosol acts as a unipolar gas, and constitutes a novel electrothermodynamic medium capable of transducing the internal and/or the kinetic power of the medium into electric power fed to an external circuit.

In one form of the converter of this invention shown in FIGURE 2, a rod shaped charge collector electrode 33 is disposed axially within the path of the charged aerosol where the gas velocity is a maximum. The potential of the collector electrode 33 and the space charge produced by the charged aerosol provides an electric field opposing the motion of the charged droplets. The charged aerosol particles of low mobility provide the intermediary between the electric field and the gas causing the thermal-kinetic power of the gas to be transduced into electrical power.

In the embodiment shown in FIGURES 1 and 3, the rod shaped collector electrode 33 projects into the converter space 24, being axially supported within the collector tube 37. Upon allowing the voltage of the collector electrode 33 to build up sufficiently during operation of the device, the breakdown spark through the aerosol has been observed proceeding at right angles between the converter wall 53 and the tip of the collector electrode 32a. It is supposed that under certain conditions of operation a thin liquid film may form on the converter wall causing increased conductivity. The charged aerosol appears to have a greater breakdown strength than the wall surface. The central collector electrode 33 can be operated at a greater voltage than a tubular wall electrode, before electrical spark breakdown occurs. Since the electrical power output is directly proportional to the square of the voltage on the collector electrode, significantly increased conversion efficiencies are obtained with the centrally disposed collector electrode compared to a device using a tubular wall collector electrode.

*The electrodynamic cycle*

Referring now to FIGURE 4, there is shown diagrammatically an electrodynamic cycle employing the power conversion device of the invention. A boiler 38 contains a vaporizable liquid such as water 40. Air may be removed from the system by a source of vacuum (not shown) connected to the boiler by pipe 41 which is provided with valve 42.

The liquid 40 is vaporized from a heat source 43 to provide a vapor 44 such as steam, in space 45 above the liquid in the boiler. The temperature of the vapor is measured by thermometer 46 within space 45. Thermostat 47 disposed within the space 45 controls heating source 43 to govern the supply of heat to the liquid.

Assuming water to be the liquid, saturated steam 44 issuing from boiler 38 enters conduit 48 which is insulated by wall 49 and is superheated by coils 50 in the conduit 48. Generally the steam is superheated to a temperature such that the steam is at or near saturation temperature after expansion in the nozzle in the vicinity of the ions 35. The vapor pressure of the superheated steam is measured by manometer 51 and its temperature by the thermometer 52.

Thus superheated steam enters the power conversion device, represented generally by numeral 53. Upon expanding to the lower pressure in the vicinity of ions formed by the corona field, as described previously, the vapor temperature drops to approximately the temperature of saturated vapor at that pressure. Thereupon a charged aerosol, consisting of charged water droplets within water vapor as the surrounding gas medium, is formed at the entrance to the conversion space 24.

The heat-kinetic power of the thus-formed charged aerosol then is transduced into electrical power in the conversion space. The charged aerosol is discharged at the collector electrode 33, and the electric circuit is completed through the load 36 back to the ionizer 30.

As an example, a test performed at 500° K. and a relative steam density of about 4.5, with a nozzle diameter of 3 mm., produced an output electrical power of 1.4 watts, at a collector electrode voltage of 50,000 volts. This corresponds to an output power of $0.2 \times 10^6$ watts/m.$^2$.

After the heat-kinetic power of the charged aerosol gas has been converted into electrical power, the cooled vapor 54 is condensed in condenser 55 and the condensate 56 is returned to the boiler 38 through pipe 57. Gravity feed returns the liquid 56 to the boiler 38, or a pump 58 is utilized if the pressure differential is large. There is thus provided an electrothermodynamic Rankine cycle having no moving parts other than that of the working substance gas, or that of an auxiliary component utilizing a minor proportion of the output power.

A larger cross section area of flow of the charged aerosol is obtained by the parallel arrangement of nozzles and the electric power output is increased proportionally.

While only a single expansion stage is shown, it will be understood that a plurality of stages may be connected in series, if needed, to reduce the vapor temperature below the condensation temperature of a given vapor steam.

FIGURES 8, 9 and 10 and Table I hereinafter set forth, show the test results obtained with examples of the invention. In Table I, Test 1 used an air stream containing water vapor, and Test 2 an air stream containing alcohol vapor. In each test the gas-vapor stream was expanded and cooled in the vicinity of an ion source, forming a charged aerosol.

In FIGURE 5 there is illustrated schematically another embodiment of the invention wherein a charged aerosol is formed by condensation. In this embodiment a condensable vapor 59 such as superheated steam, enters through a central conduit 60. Coaxial with condit 60 is gas inlet tube 61 for admitting into the device a gas or vapor 62, as for example hydrogen, air, Freon or steam. Gas of vapor 62 is maintained at a temperature somewhat less than the condensable vapor 59, and generally at a temperature where charged liquid droplets will form about the ions from the corona field. Thus the gas or vapor and condensable vapor are admixed in throat 63 of expansion nozzle 64. The combined effect of gas cooling and expansion results in a temperature such that charged aerosol liquid droplets will quickly form about an ion. A corona discharge is maintained between wire 65 carried by conduit 60 and the charging plate 29 carried by the conversion housing 26. After the charged aerosol 70 has been formed in this manner, its heat-kinetic power is tranduced into electrical power in the conversion region 24 and collected by the collector electrode 71 as before. In this method the expansion required is much less than that required in the former method, being only that small expansion accompanying the conversion and transfer of the heat-kinetic power from the gas to the electric circuit.

The charging electrode 29 in FIGURES 1 and 5, and 73 in FIGURES 6 and 7, is preferably placed starting at the throat immeditely downstream, just before the conversion space 24, 78. In this manner the charged aerosol droplets are given a chance to grow, and are drawn into the highest velocity part of the stream; and maximum power transduction occurs. Practically none of the ions from which they are formed ever reach the charging electrode. They are all eventually discharged at the collector electrode.

While the corona has been described in connection with point corona sources, a linear corona source may be employed. Referring to FIGURES 6 and 7, for example, tungsten wires 74 are positioned upstream of conducting strips 73 which are embedded in the leading edges of the parallel insulating airfoil strips 72. The airfoil strips 72 form therebetween an array of parallel linear nozzles.

Comparing FIGURES 6 and 7 with FIGURES 1 to 5, the aerosol power conversion region lies betwen parallel shaped airfoil elements 72, which have a rectangular rather than circular cross section.

FIGURE 6 is a detailed view of a portion of an airfoil section power converter in accordance with this invention. In this view 72 is an insulating airfoil section having a conducting strip 73 embedded in the leading edge. Thin wires 74 of tungsten or other suitable material are supported and maintained at a suitable distance from conducting strips 73 at the throat of the airfoil sections. The gas 75 contains a condensable vapor flowing toward the airfoil sections. A corona field is established between the wires 74 and the conducting strips 73 on the airfoils. Ions are emitted into the flowing gas-vapor stream 75 near the throat region 76 between the airfoils 72. In this region the gas-vapor is expanded and cooled and the velocity increases. The continuing change in enthalpy of the gas appears as an increase in kinetic power. The cooled vapor condenses onto the ions effectively forming charged aerosol particles 77 of low mobility. The charged particles establish a self-generated space charge electric field which opposes the forward motion of the charged particles which are coupled to, or "locked into" the gas.

In one mode of operation termed Mode A, the gas velocity and kinetic power decrease in the conversion space without thermodynamic change, the cross section between the airfoils in the conversion region at 78 increasing inversely with the gas velocity. Thus in Mode A operation there is no increase in gas pressure or temperature as the gas is slowed down by the electric field.

In the second mode of operation termed Mode B, the power transduction in the conversion space is solely a direct change in the internal heat power of the gas-aerosol to the electric power, or vice versa. In this case, the gas-aerosol temperature and pressure in the conversion region decreases and the velocity is constant. This requires a suitable small increase in the conversion space cross section. However, under most practical conditions of operation, both Modes A and B may occur simultaneously.

At the exit plane 79 the charged aerosol is discharged by positive ions 18 emitted from a positive corona at the collector electrodes 80. The collector electrode may comprise small diameter parallel wires 80 located along the central axis of flow 81 between each airfoil section, or multiple wire "point sources". A suitable material for these wires or points is tungsten.

FIGURE 7 shows an assembly view in section along the axis of flow of the airfoil converter shown in FIGURE 6. Flanged pipes 90 and 91 are held together by bolts 92 and contain the converter assembly generally indicated as 100. The converter assembly consists of three parts, each of which may be mounted within a separate frame. The first part comprises a ring-like metal frame 86 in which the thin wires 74 are mounted in a parallel array. The wires 74 may be secured to the electrically conducting frame 86 in any suitable manner as, for example, by brazing. The frame 86 may be electrically connected directly to the metal, fluid conducting pipe 90 which is shown grounded at 87.

The second assembly comprises the airfoil elements generally indicated as 102. The airfoil elements comprise an insulating airfoil section 72 having conducting strips 73 acting as the charging electrodes embedded therein, all of which may be mounted in and connected to a metal frame 84. The frame 84 serves as a common electrode to all charging electrodes 73. The frame 84 also serves as a support for the airfoil assembly 102. A conducting lead 82 is brought out through an insulating sleeve 83. Lead 82 connects to the frame 84 and eventually to all of the charging electrodes 73. An insulating spacer frame 89 serves to space the frame 84 from the frame 86 and provides insulation between them.

Similarly a spacer tube 85 serves as a support between the frame 84 and the collector electrode assembly 93. The collector electrode assembly 93 comprises a conducting frame 99 having a series of parallel wires 80 mounted along each of the axes 81 which bisect the space between the airfoil sections 72.

The wires 80 may be secured to the conducting frame 99 in any suitable manner as, for example, by brazing. The frame 84 is mounted within an insulating sleeve 95 which is nested within the pipe 90 in the vicinity of a flange. The frame 99 is supported by conducting spiders 94 to the frame 95. The frame 95 is nested within the insulating wall of the pipe 91, and is connected to the collector lug 98 by the wire 109. The frame 95 is downstream a sufficient distance so as to prevent arcing along the inside wall of the insulated tube 85; while the frame 99 and collector wires 80, project upstream, suitably spaced from the walls. The output collector voltage and electric power output are considerably increased by this arrangement.

The activating voltage source 31 is connected between the lug 97 and ground. The collector assembly 93 is connected via the terminal lug 98, to the load 36 and thence to ground back to the ionizer wire or point, thus completing the circuit.

For a conduit having a given cross sectional area, the airfoil section design possesses important advantages over the circular section design, as follows:

(1) The operating cross sectional area is greater and this results in a greater output electrical power.

(2) The corona current from linear wires is greater than from points.

(3) The wall surface area and frictional power losses are decreased by a factor of 50%.

In the device of FIGURE 1, to provide adequate cooling for charged aerosol droplet formation, and since all the cooling is produced by expansion, the gas may have to flow sonically at the throat producing excessive power loss. However, in the device of FIGURE 5, the cooling is produced by mixing the vapor with a cooler carrier gas, and only that small expansion is required to provide the conversion to electric power. Hence the device of FIGURE 5 operates subsonically with very little frictional power loss.

In the mathematical analysis which follows, the International System of Units (MKS– ° K.), except where otherwise noted, are used.

"Standard conditions" are defined at 300° K. (26.9° C.) and a pressure of $10^5$ newtons/m.$^2$ ($\approx$1 atmosphere= $1.01\times10^5$ newtons/m.$^2$).

The following symbols employed are defined as follows:

$A$=Cross-sectional area of conversion space.

$a_d=1/b_gK$; the density parameter.

$a_f=m_r/(b_gK)^2$; the friction parameter.

$a_T=(b_o^2\epsilon_o/2\delta_o)\ (1/m_rc_p)$; the temperature parameter.

$a_u=(b_gK/m_r)^{2/3}$; the velocity parameter.

$b_g$=Relative electric breakdown factor of the carrier gas; or, the ratio of the electric breakdown potential of the carrier gas to that of air, at standard conditions.

$b_o=3.08\times10^6$ volts/m., which is the approximate electric breakdown intensity of free air at standard conditions.

$C_f$=Friction loss factor.

$c_p$=Heat capacity of gas at constant pressure in joules/kg.—° K.

$c_v$=Heat capacity of gas at constant volume in joules/kg.—° K.

$D$=Nozzle throat diameter—m.

$\delta$=Gas density—kg./m.$^3$.

$\delta_a$=Relative gas density; the ratio of "the density of a gas under a given pressure and temperature" to "the density of the same gas under standard conditions."

$\Delta T$=Temperature change—° K.

$E_m$=Maximum electric intensity at which spark breakdown occurs—volts/m.

$\epsilon_o=8.85\times10^{-12}$—permittivity of free space farads/m.

$\eta_c=\Delta T/T$—The Carnot Efficiency per conversion stage.

$\eta_f=p_fp_e$=the friction/electrical power loss ratio, or the ratio of the friction power density to the output electric power density.

$\eta_k=p_e/p_k$; electric/kinetic power-conversion ratio, or the ratio of the output electric power density to the kinetic power density.

$\gamma=c_p/c_v$.

$I$=Current from collector through load—amps.

$J$=Current density—amps/m.$^2$.

$K$=Aerosol electric breakdown factor; or the ratio of the electric breakdown potential of "a charged aerosol with a given particle concentration, radii, charge density, and velocity," compared to that of "the gas only," at the same density and velocity.

$L$=Length of conversion space. This is approximately the distance between the charging electrode and the collector electrode. More accurately, it is the distance between the entrance potential plane, and the exit peak potential plane of the conversion space—meters.

$M_n$=Mach No.

$M$=Mass per second of gas-aerosol flowing per unit cross-sectional area of conversion space—kg./m.$^3$–sec.

$m_r$=Relative average molecular (or atomic) weight compared to that of air. Air has a mean molecular weight of 28.8.

$p_f$=Friction power density loss—watts/m.$^2$
$p_e$=Output electric power density—watts/m.$^2$
$p_k$=Kinetic power density—watts/m.$^2$
$\rho$=Charge density in conversion space—coulombs/m.$^3$
$T$=Absolute temperature ° K.
$T_a$=$T/T_o$=$T/300$=absolute temperature based upon 300° K. as the unit temperature
$T_o$=300° K.—standard temperature
$U$=Gas velocity—meters/sec.
$V_c$=Peak potential of space charge in the conversion space—volts.

MATHEMATICAL ANALYSIS

The peak electric potential generated in the conversion space was derived and given in Equation 16 of Patent No. 2,688,555, now expressed with revised symbols:

$$V_c = \rho L^2 / 2\epsilon_0 \quad \text{(volts)} \quad (1)$$

The maximum electric field intensity, given by the space charge formula, occurs at the entrance plane of the conversion space and is limited by the electric breakdown strength of the charged aerosol gas:

$$E_m = 2V_c/L = \rho L/\epsilon_0 = b_0 b_g K \delta_a \quad \text{(volts/m.)} \quad (2)$$

The maximum electric potential difference which may be generated at each stage is limited by spark breakdown. From (2) this is:

$$V_c = (b_0/2) L b_g K \delta_a \quad \text{(volts)} \quad (3)$$

The current density is given by:

$$j = \rho U \quad \text{(amps/m.}^2\text{)} \quad (4)$$

The motion of the charged aerosol may be produced by the expansion of a gas from liquid heat in a boiler; for example in a Rankine or Brayton cycle.

Operating "Mode A" is defined as the conversion of kinetic power only to electric power in the conversion space.

Operating "Mode B" is defined as the conversion of a part of the internal heat power of a charged aerosol gas to electric power, with no change in kinetic power. Power conversion occurs with a decrease in the temperature of the gas-aerosol, at constant velocity.

Power conversion usually occurs with a combination of operating Modes A and B.

The input kinetic power density of the gas is given by:

$$p_k = \delta U^3/2 = (\delta_0/2) m_r \delta_a U^3 \quad \text{(watts/m.}^2\text{)} \quad (5)$$

The output electric power density of the charged aerosol-gas from (1), (2) and (4) is given by:

$$p_e = jV_c = (b_0^2 \epsilon_0/2) b_g^2 K^2 \delta_a^2 U \quad \text{watts/m.}^2 \quad (6)$$

where $$(b_0^2 \epsilon_0/2) = 42$$

From (5) and (6) the ratio of the output electric power density to the kinetic power density for one stage is given by:

$$\eta_k = p_e/p_k = (b_0^2 \epsilon_0/\delta_0) b_g^2 K^2 \delta_a / U^2 m_r \quad (7)$$

where $$(b_0^2 \epsilon_0/\delta_0) = 72$$

The term $\eta_k$ represents a comparison of the output electric power to the kinetic power. The power conversion can be from kinetic power, internal heat power, or both. The term $\eta_k$ is useful whether or not the change in kinetic power is actually involved in the conversion to electric power.

Thus, Equation 7 is true for power transduction in Mode A and/or Mode B.

Figure 8:
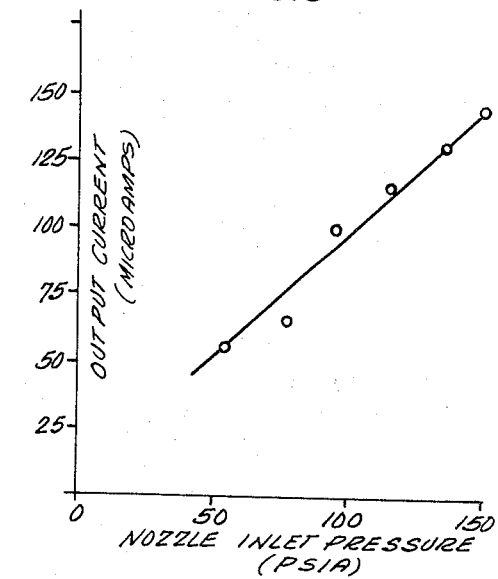
FIGURES 8, 9 and 10 are graphs showing the output current, output voltage and output power vs. nozzle inlet pressure for a power conversion device according to the present invention.
Figure 9:
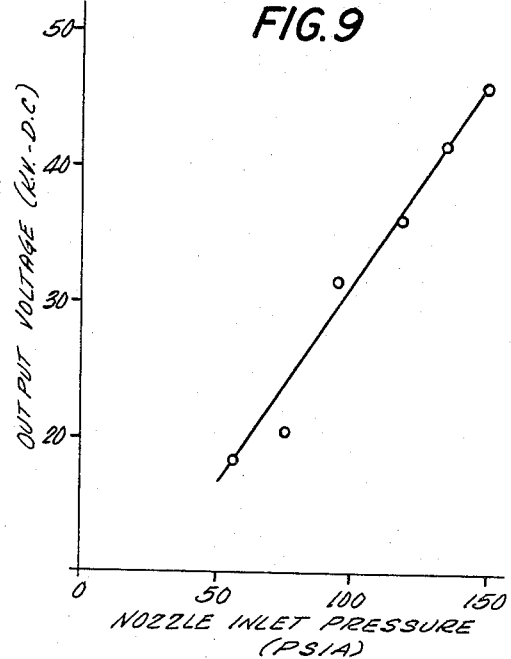
Figure 10:
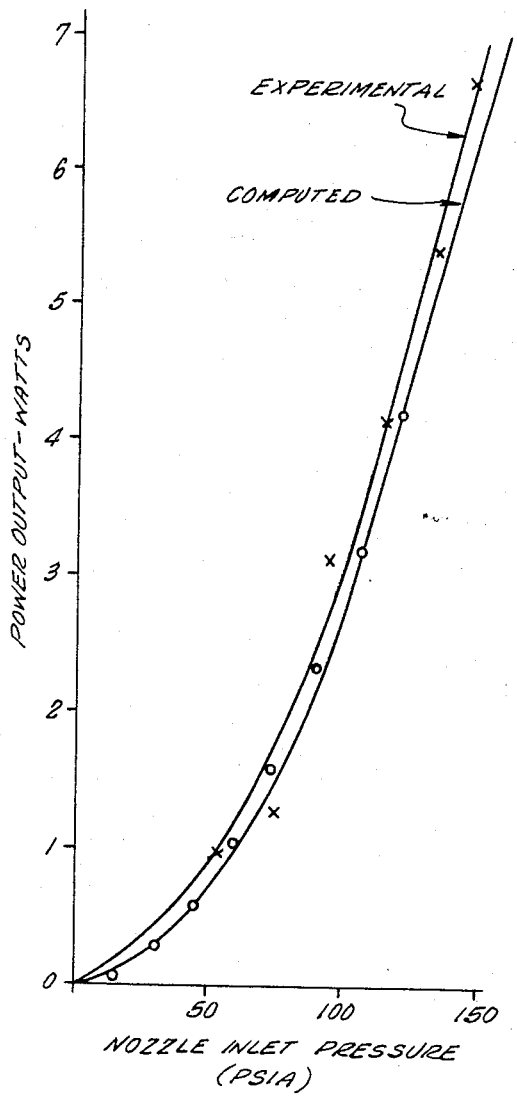

The results of experimental work are shown in FIGURES 8, 9 and 10.

The collector voltage was found to rise linearly with the gas density, or pressure at constant temperature. The collector current was also found to rise linearly with gas density, or pressure at constant temperature. As a consequence, the output electric power is found to rise as the square of gas density, or the square of pressure at constant temperature. The critical length of the conversion space is related to charge density and the maximum electric potential difference as predicted by Equations 1 and 3.

Experiment and theory are in excellent agreement.

These results verify Equation 6 and validate the analysis.

It was found that the condensation process efficiently provides charged aerosol particles of negligible mobility and high concentration.

Table I shows the observed operating characteristics obtained on test of the device shown in the FIGURES 1, 2 and 3; and operating parameters calculated therefrom.

TABLE I

| | Symbol | Units | Test 1 | Test 2 |
|---|---|---|---|---|
| Observed | | | | |
| Electric Power Input | $P_{in}$ | Watts | 0.1 | 0.03 |
| Electric Power Output | $P_e$ | Watts | 10.0 | 6.64 |
| Voltage Output | $V_c$ | Volts | 52,000 | 46,000 |
| Current Output | $I$ | Microamps | 192 | 145 |
| Nozzle Throat Dia. | $D$ | mm. | 7 | 4.5 |
| Conversion Length | $L$ | mm. | 7.6* | 3 |
| Pressure Inlet | $P_1$ | Atmos. | 10.2 | 10.2 |
| Temperature Inlet | $T_1$ | ° K. | 300 | 300 |
| Aerosol Gas | | | Air | Air |
| Aerosol Liquid | | | Water | Ethanol |
| Inlet Vapor | | | 70% relative humidity | Saturated |
| Gas Breakdown Factor | $b_g$ | | 1 | 1 |
| Area | $A$ | mm.$^2$ | 38.3 | 15.9 |
| Power Density | $P_e$ | Watts/m.$^2$ | 0.26×10$^6$ | 0.42×10$^6$ |
| Current Density | $i$ | Amps/m.$^2$ | 5 | 9.1 |
| Velocity | $U$ | m./sec. | 316 | 316 |
| Charge Density | $\rho$ | Coulombs/m.$^3$ | 0.015 | 0.029 |
| Gas Density | $\delta_a$ | Atoms | 6.6 | 6.6 |
| Temperature | $T_a$ | 300° K.=1 | 0.81 | 0.81 |
| Aerosol Breakdown Factor | $K$ | | 0.81 | 1.51 |
| Kinetic-Electric Power Conversion Efficiency per Stage. | %$\eta_k$ | | 0.31% | 1.1% |

*Calculated.

Test 1 utilized inlet air having a relative humidity of 70% which comprised water vapor having a mass of $10^{-4}\%$ of the mass of the air. A value of $K=0.81$ resulted; compared to $K=1$ for pure air. The smaller value of K may be due to insufficient water vapor in the air to completely precipitate around all the ions, leaving some free ions available to initiate the spark breakdown. Or, because of the small quantity of water vapor available for condensation onto the ions, charged aerosol particles formed were of too small a radius and some may have subsequently re-evaporated in the conversion space to form free ions. Such re-evaporation could be due to under saturation or heating due to drag forces caused by the excessive slip of these smaller particles.

A K value of 1.51 was obtained with Test 2 which employed inlet air saturated with ethanol vapor, comprising about 5.7% of the mass of the gas. The presence of sufficient supercooled vapor augments the value of K; that is, increases the electric field intensity required for spark breakdown to occur through a charged aerosol.

The value of K may be increased by electron capture which results from:

(1) a large total aerosol particle cross section;

(2) supercooled vapor causing condensation onto free electrons or ions; and (3) the presence of electron-attaching or spark-inhibiting gases [$CCl_4$, $SF_6$, $Cl_2$, fluorocarbon (Freon), etc.].

As another example, Test 3 used the point ring section of FIGURE 5, employed Teflon parts, and a relative steam density of 4.3. The temperature was about 425° K. and the steam was somewhat above saturation. The output electric power density obtained was 12 watts/cm.$^2$ or 30% of the predicted power density of 40 watts/cm.$^2$ calculated from the Equation 6.

Operation is achievable up to 70° superheat. As the superheat decreases, the particle size increases and greater efficiencies are obtained.

In Test 3 the output electric power density obtained was less than the predicted value. This is attributed to charged aerosol droplets in the conversion space having a radius smaller than the critical radius required for negligible slip ($10^{-8}$ to $10^{-7}$ m.; or, 100 A.–1000 A.). Charged aerosol particles having smaller radii result in excessive slip between the gas and the charged aerosol, hence less efficient power transduction.

The output electric power density in these experimental tests was of the order of $10^5$ to $10^6$ watts/m.$^2$. The electric power density was found to increase with the square of the gas density. There was no apparent upper limit to the output electric power density as the gas density increased.

Between two planes along the conversion space, the balance between the differential changes per unit are of the "heat power" and "kinetic power" inputs, and the maximum "electric power" output limited by spark breakdown according to Equation 6, is shown by:

$$P_e = Mc_p \Delta T + M U \Delta U/2 = (b_o^2 \epsilon_0/2) b_g^2 K^2 \delta_a^2 U$$
$$= 42 b_g^2 K^2 \delta_a^2 U \quad (8)$$

where $$\dot{M} = \delta_o m_r \delta_a U \quad (9)$$

This invention defines operating conditions under which friction power losses are minimized. In the subsonic region there is no shock wave compression. Friction power loss per unit cross section flow is then given by the well known pipe friction loss formula, herein converted to the normalized form:

$$p_f = [C_f \delta_o/2](L/D) m_r \delta_a U^3 \quad (10)$$

For operation in Modes A or B, or simultaneously in Modes A and B, the friction-electric power loss ratio $\eta_f$, is obtained from (10) and (6).

$$\eta_f = (p_f/p_e) = (\delta_o C_f / \epsilon_o b_o^2)(L/D) m_r U^2 / b_g^2 K^2 \delta_a \quad (11)$$

The friction loss factor $C_f$ may be taken as:

$$C_f = 0.02 \quad (12)$$

Hence:

$$(\delta_o C_f / \epsilon_o b_o^2) \cong 2.8 \times 10^{-4} \quad (13)$$

For an airfoil converter $$(L/D) \sim 0.5 \quad (14)$$

Evaluating the constant terms in (11) from (13) and (14):

$$\eta_f = 1.4 \times 10^{-4} [m_r/(b_g K)^2](U^2/\delta_a) \quad (15)$$

A parameter of the composition of a charged aerosol related to the friction-electric power loss ratio $\eta_f$, is the friction parameter $a_f$ which is defined by:

$$a_f = m_r/(b_g K)^2 \quad (16)$$

Hence (15) becomes:

$$\eta_f = 1.4 \times 10^{-4} a_f U^2/\delta_a \quad (17)$$

Equation 17 shows, for given values of U and $\delta_a$, the importance of a small friction parameter $a_f$ in decreasing the friction-electric power loss ratio $\eta_f$.

The relative molecular weight of the working gas-aerosol compared to air is $m_r$. For an air-water charged aerosol $m_r = 1$. For a steam-water charged aerosol $m_r = 0.625$. For a hydrogen-water charged aerosol $$m_r = 0.0695$$

By using a proportion of an electron attaching inhibitor gas or vapor in the carrier gas, a value of about $b_g = 2$ is obtainable.

By supercooling is meant a condition of the temperature and partial pressure of the vapor in the carrier gas, such that condensation of the vapor to liquid rapidly occurs onto ions or charged droplets in the gas. The vapor in the conversion space may be supercooled by operating in Mode B, or Modes A and B, to cause rapid condensation onto free ions if present. Supercooling greatly impedes spark breakdown which results in an increase in the value of K for example up to 3 or more.

Table II summarizes values of the density parameter $a_d$, the friction parameter $a_f$, and the velocity parameter $a_u$, for charged aerosols of various composition with and without inhibition, supercooling or both in the conversion space.

The density parameter $a_d$ relates the density of a charged aerosol to the electric breakdown factor $b_g$ and K, and is defined by:

$$a_d = 1/b_g K \quad (18)$$

The velocity parameter $a_u$, relates the operating velocity required for a given output electric power $p_e$ and the electric-kinetic power conversion ratio, $\eta_k$. The parameter $a_u$ is defined by:

$$a_u = (b_g K/m_r)^{2/5} \quad (19)$$

The friction parameter $a_f$ defined by Equation 16 is proportional to the molecular weight of the gas $m_r$, and inversely proportional to the square of electric breakdown factors, or $(b_g K)^2$. The parameters $a_d$ and $a_u$ vary more slowly with these variables. The friction parameter is thus the parameter most affected by these variables.

TABLE II.—FRICTION PARAMETER $a_f$ AND VELOCITY PARAMETER $a_u$, FOR CHARGED AEROSOLS OF VARIOUS COMPOSITIONS

| No. | Charged Aerosol | $m_r$ | $b_g$ | K | Density Parameter $a_d$ | Friction Parameter $a_f$ | Velocity Parameter $a_u$ |
|---|---|---|---|---|---|---|---|
| 1 | Air-Water | 1.00 | 1.0 | 1 | 1.0 | 1.000 | 1 |
| 2 | H₂-Water | 0.07 | 0.53 | 1 | 1.89 | 0.2500 | 2.25 |
| 3 | 1-inhibited | 1.00 | 2.0 | 1 | 0.5 | 0.2500 | 1.32 |
| 4 | 2-inhibited | 0.07 | 1.0 | 1 | 1.0 | 0.0695 | 2.91 |
| 5 | 3-supercooled | 1.0 | 2.0 | 3 | 0.168 | 0.0278 | 2.05 |
| 6 | 4-supercooled | 0.07 | 1.0 | 3 | 0.333 | 0.0077 | 4.5 |

Table II shows the approximate ranges of variation:

(1) of $a_d$:
$$0.1 < a_d < 2 \qquad (20)$$

(2) of $a_f$:
$$0.007 < a_f < 1 \qquad (21)$$

(3) of $a_u$:
$$1 < a_u < 5 \qquad (22)$$

MODE A

The operating parameters consistent with a small percent loss due to frictional power, are established in the following manner:

By definition $\eta_f = p_f/p_e$ and $\eta_k = p_e/p_k$, hence from (7) and (11):

$$\eta_f \eta_k = C_f(L/D) \qquad (23)$$

For an airfoil converter, the constant terms in (23) are evaluated using (12) and (14):

$$\eta_f \eta_k \cong 0.01 \qquad (24)$$

A large conversion ratio $\eta_k$ is a requisite for a small friction loss ratio $\eta_f$.

Equation 24 enables a range of operating parameters to be specified.

$$\begin{matrix} 1 > \eta_k > 0.10 \\ .01 < \eta_f < 0.10 \end{matrix} \qquad (25)$$

It is, of course, preferable to make $\eta_f = 0.04$ or less in which case it may be considered negligible.

At each electrical stage, the friction power loss is converted to heat at the temperature of the gas at the exit plane of the conversion space. The heat resulting from the friction power loss, however, is available for further conversion to output electric power at the next converter stage. Hence the value of $\eta_f$ can be applied to the total temperature drop of multiple stages and is not cumulative.

Equation 6 and 11 completely specify the relations between $p_e$, $\eta_f$, U, $\delta_a$, $m_r$, $b_g$ and K. These equations are, however, subject to restrictions which specify an appropriate range of values for the variables.

From (5) and (7):

$$p_e = (\delta_0/2) \eta_k m_r \delta_a U^3 \qquad (26)$$

The relative gas density $\delta_a$ may be obtained from (6):

$$\delta_a = [2/b_o^2 \epsilon_0]^{1/2} (1/b_g K)(p_e/U)^{1/2}$$
$$= 0.1546 a_d (p_e/U)^{1/2} \qquad (27)$$

From (26) and (27), eliminating $\delta_a$ and solving for U:

$$U = (2b_o^2 \epsilon_0/\delta_o^2)^{1/6} (b_g K/m_r)^{1/3} (p_e/\eta_k^2)^{1/6} \qquad (28)$$

in which $$(2b_o^2 \epsilon_0/\delta_o^2)^{1/6} = 2.62 \qquad (29)$$

Hence, substituting (19) and (29) into (28):

$$U = 2.62 a_u (p_e/\eta_k^2)^{1/6} \qquad (30)$$

For an airfoil configuration, Table III summarizes calculations for relative gas density and gas velocity, for a fixed electric power density, and a fixed electric-kinetic conversion ratio, $\eta_k$, as a function of the gas parameters for the various charged aerosol compositions shown in Table II. The calculations were made using Equations 27 and 30.

For the calculations of Table III, the power density output was taken constant at two levels; $10^6$ watts/m.² and $10^8$ watts/m.²; or, 0.1 kw./cm.² and 10 kw./cm.² respectively.

Calculations were made for three values of the electric/kinetic conversion ratio $\eta_k = 1$; 0.25, and 0.10; and three corresponding friction/electric ratios $\eta_f = 0.01$, 0.04 and 0.10, respectively.

As previously shown, the output electric power density is transduced from the kinetic power (Mode A) and/or the internal heat power (Mode B) of the gas. A decrease in the internal heat power of the gas is manifested by a decrease in temperature in the conversion space.

Using Mode A operation only: $\eta_k < 1$. With Mode A operation $\eta_k$ cannot reach unity, since this requires decreasing the gas velocity to zero. However, with Mode B operation $\eta_k$ can be less than, equal to, or exceed 1. With Mode B operation, the gas velocity remains constant and the gas-aerosol temperature decreases. Also with combined Mode A and Mode B operation $\eta_k$ may equal or exceed 1.

TABLE III.—OPERATING PARAMETERS FOR CHARGED AEROSOLS OF VARIOUS COMPOSITIONS

$\eta_k = 1 \qquad \eta_f = 0.10$

| Gas-Aerosol Composition Number | Electric Power Density $p_e$ | | | |
|---|---|---|---|---|
| | $10^6$ watts/m.² | | $10^8$ watts/m.² | |
| | Column | | | |
| | 1 | 2 | 3 | 4 |
| | Velocity U, m./sec. | Relative Density $\delta_a$ | Velocity U, m./sec. | Relative Density $\delta_a$ |
| 1 | 41 | 238 | 104 | 151 |
| 2 | 93 | 302 | 235 | 190 |
| 3 | 54 | 105 | 138 | 66 |
| 4 | 119 | 141 | 302 | 89 |
| 5 | 84 | 28 | 214 | 18 |
| 6 | 185 | 38 | 470 | 24 |

$\eta_k = 0.25 \qquad \eta_f = 0.04$

| Gas-Aerosol Composition Number | Column | | | |
|---|---|---|---|---|
| | 5 | 6 | 7 | 8 |
| 1 | 72 | 174 | 181 | 115 |
| 2 | 163 | 228 | 409 | 144 |
| 3 | 95 | 79 | 239 | 50 |
| 4 | 209 | 107 | 523 | 67 |
| 5 | 148 | 21 | 372 | 13 |
| 6 | 326 | 28 | 817 | 20 |

$\eta_k = 0.10 \qquad \eta_f = 0.10$

| Gas-Aerosol Composition Number | Column | | | |
|---|---|---|---|---|
| | 9 | 10 | 11 | 12 |
| 1 | 104 | 151 | 262 | 95 |
| 2 | 235 | 190 | 590 | 120 |
| 3 | 138 | 66 | 346 | 42 |
| 4 | 302 | 89 | 756 | 55 |
| 5 | 213 | 18 | (537) | (11) |
| 6 | 470 | 24 | 1,180 | 14 |

From (2), putting $V_c = 10^5$ volts or 100 kv., and expressing L in mm.:

$$L_{mm} = 65/b_g K \delta_a \quad (31)$$

Table IV shows the length of the conversion space in mm for the various charged aerosol compositions set forth in Table II. The relative densities $\delta_a$ were taken from Table III.

TABLE IV.—THE LENGTH L (mm.) OF THE CONVERSION SPACE FOR VARIOUS CONDITIONS OF OPERATION, at, A CONSTANT COLLECTOR VOLTAGE= 100 KV.

$\eta_k = 1 \quad \eta_f = 0.10$

| Gas-Aerosol Composition Number | Electric Power Density $p_\epsilon$ | | | |
|---|---|---|---|---|
| | $10^6$ watts/m.² | | $10^5$ watts/m.² | |
| | Column | | | |
| | 20 | 21 | 22 | 23 |
| | $b_gK\delta_a$ | L, mm. | $b_gK\delta_a$ | L, mm. |
| 1 | 238 | 0.27 | 151 | 0.43 |
| 2 | 160 | 0.41 | 100 | 0.65 |
| 3 | 210 | 0.31 | 132 | 0.49 |
| 4 | 141 | 0.46 | 89 | 0.73 |
| 5 | 168 | 0.39 | 105 | 0.62 |
| 6 | 114 | 0.57 | 71 | 0.91 |

$\eta_k = 0.25 \quad \eta_f = 0.04$

| Gas-Aerosol Composition Number | Column Number | | | |
|---|---|---|---|---|
| | 24 | 25 | 26 | 27 |
| 1 | 174 | 0.37 | 115 | 0.57 |
| 2 | 121 | 0.54 | 76 | 0.85 |
| 3 | 158 | 0.41 | 100 | 0.65 |
| 4 | 107 | 0.61 | 67 | 0.97 |
| 5 | 126 | 0.52 | 80 | 0.82 |
| 6 | 84 | 0.77 | 59 | 1.1 |

$\eta_k = 0.10 \quad \eta_f = 0.10$

| Gas-Aerosol Composition Number | Column Number | | | |
|---|---|---|---|---|
| | 28 | 29 | 30 | 31 |
| 1 | 151 | 0.43 | 95 | 0.68 |
| 2 | 124 | 0.52 | 63.5 | 1.02 |
| 3 | 132 | 0.49 | 83 | 0.78 |
| 4 | 88.5 | 0.73 | 55 | 1.18 |
| 5 | 106 | 0.61 | 67 | 0.97 |
| 6 | 71 | 0.92 | 41 | 1.58 |

Table IV shows that for an operating output potential of 100 kv., L is between 0.43–1.6 mm. for power densities of about 100 kw./cm.², and between 0.27–0.92 mm. for power densities of about 0.10 kw./cm.².

MODE B

A charged aerosol, moving at a constant subsonic velocity, produces output electric power from the internal heat-power, resulting in a decrease in temperature between the entrance and exit planes of the conversion space.

From (8) and (9) this temperature decrease is:

$$p_\epsilon = \delta_0 (m_r c_p) \delta_a U \Delta T \quad (32)$$

The maximum temperature drop during electric power extraction is obtainable in terms of relative gas density $\delta_a$ and breakdown factors $b_g$ and K, by setting $\Delta U = 0$ in (8), and using (6):

$$\Delta T = a_T b_g^2 K^2 \delta_a \quad (33)$$

in which $a_T$ is the temperature parameter:

$$a_T = (b_0^2 \epsilon_0 / 2\delta_0)(1/m_r c_p) = 36/m_r c_p \quad (34)$$

Table V shows for various gases and vapors, that $a_T$ is approximately constant.

TABLE V.—VALUES OF $a_T$ FOR VARIOUS GASES AND VAPORS FOR ONE ATMOSPHERE PRESSURE

| Gas | Temp., °C. | $c_p$, joules/ kg.-°K. $10^3$ | $m_r$ | $m_r c_p$, joules/ °K.-kg.×$10^3$ | $a_T \times 10^{-2}$ $36/m_r c_p$ |
|---|---|---|---|---|---|
| Air | 0 | 1.0 | 1.00 | 1.00 | 3.60 |
| Cl₂ | 15 | 0.48 | 2.46 | 1.17 | 3.08 |
| He | −180 | 5.2 | 0.139 | 0.725 | 4.97 |
| H₂ | 15 | 14.1 | 0.0695 | 0.98 | 3.67 |
| Steam | 100 | 2.01 | 0.625 | 1.25 | 2.88 |

As an example, with charged water droplets in air or hydrogen $a_T = 0.036$. With a relative gas density $\delta_a = 28$ and using a small quantity of an electron attracting gas; for example, $Cl_2$, $SF_6$ or $CCl_4$ which acts as a spark inhibitor;

$$1 < b_g < 6 \quad (35)$$

Hence, from (28):
$$\Delta T = 1 - 36° \text{ K.}$$

With charged water droplets in helium with a small quantity of inhibitor, the same results are obtainable wth a smaller relative gas density $\delta_a = 20$.

For if the temperature is 530° K., $\delta_a = 28$, and $Kb_g = 1$, then from (34):

$$\eta_c \cong 0.2\% \text{ per electrical stage} \quad (36)$$

However, if $\delta_a = 112$, and $(b_gK) = 2$, then:

$$\eta_c \cong 3.2\% \text{ per electrical stage} \quad (37)$$

Consequently a Rankine cycle operating between 400° K. and 300° K. with a 25% Ideal Carnot Efficiency, will require between 8 and 100 stages to extract all available power. However, using Mode B operation, and increasing K by super-cooling the charged aerosol in the conversion space, the temperature drop is greater and the power may be extracted in 1 to 3 stages.

Many electrical stages and temperatures from 1500° K. to 300° K. must be used to obtain an overall efficiency in the 20–60% range.

For Mode B the friction electric/kinetic ratio $\eta_f$ is derived the same way as for Mode A and Equation 17 still applies. The decrease in temperature at constant velocity is related to the velocity and friction factor as follows:

From (10) and (30):

$$\eta_f = p_f / p_\epsilon = [C_f \delta_0 / 2](L/D) m_r \delta_a U^3 / m_r c_p \delta_0 \delta_a U \Delta T \quad (38)$$

Hence $$\Delta T = (C_f / 2)(L/D) U^2 / c_p \eta_f \quad (39)$$

Evaluating (39) for the airfoil structure, using (12) and (14):

$$\Delta T_s = 5 \times 10^{-3} U^2 / c_p \eta_f \quad (40)$$

For thermodynamic theory:

$$(R/c_p) = (\gamma - 1)/\gamma \quad (41)$$
$$U^2 = M_n^2 C^2 = M_n^2 (\gamma RT) = M_n^2 (\gamma - 1) c_p T \quad (42)$$

Defining the Carnot efficiency per conversion stage:

$$\eta_c = (\Delta T / T) \quad (43)$$

Hence from (37), (41) and (42):

$$\eta_f \eta_c = (C_f / 2)(L/D)(\gamma - 1) M_n^2 \quad (44)$$

For an airfoil converter (43) becomes:

$$\eta_f \eta_c = 5 \times 10^{-3} (\gamma - 1) M_n^2 \quad (45)$$

TABLE VI.—RATIO OF SPECIFIC HEATS AT ONE ATMOSPHERE PRESSURE

| Gas or Vapor | Temp., °C. | $\gamma = c_p/c_v$ |
|---|---|---|
| Air | 20 | 1.40 |
| Helium | −180 | 1.66 |
| Hydrogen | 15 | 1.41 |
| Steam | 100 | 1.324 |

As an example, taking $\gamma \cong 1.40$ for air or hydrogen; $\eta_f = 0.04$ (4% friction power loss), and using $M_n = 0.5$ (Mach No.), then $$\eta_c = 5 \times 10^{-3}(1.4 - 1)(0.5)^2 / 4 \times 10^{-2} = 0.125 \ (12.5\%) \quad (46)$$

Now considering the conversion space, if the input temperature is 500° C., then the output temperature is $$(500)(1 - 0.125) \cong 438° \text{ C.}$$

Summarizing, Table VII sets forth design characteristics of devices according to this invention which result in small friction loss.

TABLE VII.—CHARACTERISTICS FOR A NEGLIGIBLE FLECTRO-FRICTION POWER LOSS RATIO

| No. | Variable | Symbol | Units | Minimize | Maximize | Range |
|---|---|---|---|---|---|---|
| 1 | Gas-Aerosol Velocity | U | m./sec. | X | | 100–400 |
| 2 | Relative Mean Molecular Weight | $m_r$ | | X | | 0.0695–1.00 |
| 3 | Electric Breakdown Strength of Pure Gas Relative to Air. | $b_g$ | | | X | 1–6.3 |
| 4 | Electric Breakdown Strength of Aerosol-Gas Relative to Pure Gas. | K | | | X | 1–5 |
| 5 | Gas-Aerosol Density Relative to Same Gas Under Standard Conditions. | $\delta_a$ | | | X | 20–150 |
| 6 | Frictional Power Loss Factor | $\eta_f$ | | X | | 1%–10% |
| 7 | Conversion Space Length | L | mm. | X | | 0.3–1.6 |

To minimize friction losses, subsonic velocity is preferred. Using subsonic velocity, the expansion ratio required to supercool the vapor may not be achievable at the throat of the nozzle at the entrance plane in the conversion space. The vapor-gas mix cooling principle illustrated in FIGURE 5 may be preferred so that the charged particle radius will grow with adequate supercooling to a radius requisite for efficient power transduction.

Referring to Table IV, with the output voltage restricted to about 100 kv., and $\eta_k=1$; $\eta_f=0.01$, the dimension L for the conversion space is approximately 0.3 to 0.9 mm.

With greater power densities, the dimension L is increased. For example, proceeding from $10^6$ watts/m.$^2$ to $10^8$ watts/m.$^2$, the dimension L increases by about 50%. Moreover, an inhibited and supercooled gas is preferred, since these in general enable an increase in the dimension L of the airfoils.

Moreover, if the conversion ratio $\eta_k$ is smaller, and the friction factor $\eta_f$ greater, then the dimensions of the airfoil section are somewhat increased. For example, for $\eta_k=0.10$, $\eta_f\cong0.10$, and with the inhibited and supercooled vapor, the range of dimensions are now 0.43 to 1.6 mm.

In practice, for 100 kv. the airfoil array is miniature with a dimension L between 0.5 and 1.5 mm.

So that a large charged aerosol droplet radius be not required, and to obtain a large current density, it is preferred that the charged aerosol velocity equal or exceed 300 m./s. Also the gas velocity should be less than 0.7 Mach to keep the flow subsonic and thus minimize friction. For practical reasons it is also preferred that the relative gas density be less than 150.

Referring to Tables II and III, only certain compositions and operating conditions meet the criteria that the velocity should be greater than 300 m./sec., but less than 0.7 Mach, and that the relative gas density should be less than 150.

In Table III, for $\eta_k=1$; $\eta_f=0.01$, the above criteria are only met with compositions 4 and 6 and with a power density of $10^8$ watts/m.$^2$. Table II shows that composition 4 is a hydrogen-water charged aerosol which has been inhibited with an electron attaching gas as set forth previously, and composition 6 is also a hydrogen-water charged aerosol which has been inhibited and also supercooled. The velocities are 302 m./s. and 470 m./s., and the relative densities are 89 and 24 respectively.

However, if $\eta_k=0.25$ and $\eta_f=0.04$, then the criteria are met with a power density $10^6$ watts/m.$^2$ by composition 6 only, which is an inhibited and supercooled hydrogen-water charged aerosol. The operating velocity is 326 m./sec. with a relative density of 28. On the other hand, if the output power density is increased to $10^8$ watts/m.$^2$, then compositions 2, 4, 5 and 6 will meet the above criteria. Composition 2 is a pure hydrogen-water charged aerosol operating at a velocity of 409 m./sec. at a relative density of 144. For composition No. 4, the inhibited hydrogen-water charged aerosol, the operating conditions are 523 m./sec. and a relative density of 67. Composition 5 is an air-water charged aerosol which has been inhibited and supercooled, operating at 372 m./sec. at a relative density of 13.3. A high operating temperature is required so that the Mach number is sufficiently small for subsonic operation. Composition No. 6, a hydrogen-water aerosol which has been inhibited and supercooled, operates at 817 m./sec. and at a relative density of 19.5.

In Table III, for $\eta_k=0.10$ and $\eta_f=0.10$, the criteria are met, at a power density of $10^6$ watts/m.$^2$ by compositions No. 4 and 6. Composition No. 4, an inhibited hydrogen-water charged aerosol, operates at a velocity of 302 m./sec. and a relative gas density of 88.5. The criteria are also met by composition No. 6, a hydrogen-water charged aerosol, inhibited and supercooled, operating at a velocity of 470 m./sec. and a relative gas density of 23.6. For a power density of $10^8$ watts/m., the criteria are met with compositions 2, 3, 4 and 6. The data for composition No. 5, is placed in parenthesis to indicate that the operation is in the supersonic range and the friction-formula herein used does not apply.

With composition No. 2, the pure hydrogen-water charged aerosol, the operating velocity is 590 m./sec. at a relative density of 120. With composition No. 3 which is an inhibited air-water charged aerosol, operation is at 346 m./sec. and a relative gas density of 41.5. This velocity is just about sonic under standard conditions, but is subsonic at higher temperatures.

Composition 4 which is an inhibited hydrogen-water aerosol, operates at 756 m./sec. at relative gas density of 55.

Composition 6 is a hydrogen water aerosol which has been inhibited and supercooled, and this operates at the highest gas velocity of 1180 m./sec., and small gas density of 13.5.

Summarizing the results of the calculations:

(1) Using a charged aerosol having a high electric breakdown strength due to the employment of an electron attracting carrier gas, and/or a supercooled vapor therein, and in which the mean molecular weight of the carrier gas is small, there is achieved:

(a) The largest operating velocity
(b) The smallest relative gas density
(c) The greatest electric-kinetic conversion ratio
(d) The smallest friction-electric loss ratio.

(2) A gas-aerosol velocity of more than 300 m./s. and less than 0.7 Mach, and a relative gas density of less than 150 is attainable with a greater range of charged aerosol-gas compositions at electrical power densities in excess of $10^6$ watts/m.$^2$ and preferably of the order of $10^8$ watts/m.$^2$.

(3) For output voltages of the order of 100 kv. and under the specified operating conditions, a miniature airfoil array with a conversion length of the order of 1 mm. is required.

(4) An unprecedentedly great power conversion concentration. For 10 kw./cm.$^2$ in a cube of 1 cm.$^3$ at a mean density of 5 gm./cm.$^3$, the power concentration is of the order of 1 megawatt/kg.

Having thus fully described the invention what is claimed as new and sought to be secured by Letters Patent of the United States is:

1. The method of instantaneously forming and charging an aerosol which comprises mixing a gas with a condensable vapor producing a corona field between an emitter and a charging electrode directing the mixture into the corona field while cooling the said mixture in a region between the emitter and charging electrode to form charged droplets of low mobility and submicron radius upon the ions in the corona field.

2. The method of instantaneously forming and charging an aerosol according to claim 1 in which the vapor is supersaturated.

3. The method of instantaneously forming and charging an aerosol according to claim 1 in which the vapor is cooled below the condensation temperature by expansion in the region between the emitter and charging electrode.

4. The method according to claim 2 in which the gas and vapor are the same substance.

5. The method according to claim 3 in which the vapor is steam.

6. The method of converting the heat/kinetic power of a gas containing a condensable vapor into electrical power which comprises forming and charging an aerosol by producing a corona field between an emitter and a charging electrode, directing the gas into the corona field, while cooling the said gas in the region between the emitter and charging electrode to form a charged aerosol passing the charged aerosol through a repelling electrical space charge field, and neutralizing the charge upon the aerosol droplets upon a charge collector thereby converting the heat/kinetic power of the gas into electrical power.

7. The method of converting the heat/kinetic power of gas into electrical power which comprises forming a gas containing a superheated vapor condensable therein, producing a corona field between an emitter and a charging electrode transporting said gas to the vicinity of the corona field, supersaturating said vapor to condense droplets of submicron radius on the ions within said field thereby to form a charged aerosol, passing the aerosol through a repelling electrical space charge field down stream of the charging electrode and neutralizing the charge upon the charged aerosol droplets upon a charge collector to convert the heat/kinetic power of the gas into electrical power.

8. The method of converting the heat/kinetic power of gas into electrical power which comprises mixing a gas with superheated steam, producing a corona field between an emitter and a charging electrode transporting said mixture to the vicinity of the corona field and cooling said vapor by expansion in the region between the emitter and charging electrode below its condensation temperature to condense low mobility charged water droplets of submicron radius on the ions within said field thereby to form a charged aerosol, passing the aerosol through a repelling electrical space charge field, downstream of the charging electrode and neutralizing the charge upon the aerosol droplets upon a charge collector to convert the heat/kinetic power of the gas into electrical power.

9. A power transducer for conversion of the internal heat power of a moving gas to electrical power comprising an inlet conduit, a source of gas under pressure containing a condensable vapor connected to the conduit, a housing having a bore therein communicating with said conduit, a nozzle to receive the gas containing the condensable vapor therein coming through the bore at a suitable velocity, an outlet in said nozzle, an expansion chamber upstream of the outlet of said nozzle for receiving said gas and cooling said vapor by expansion below its condensation temperature, a charging plate disposed between said nozzle outlet and expansion chamber, said charging plate having a central opening through which said gas is transported from the expansion chamber, an adjusting screw carried by the said housing, a point ionizer on said adjusting screw disposed in said expansion chamber and extending toward said charging plate, a source of potential connected between the charging plate and the point ionizer for applying an ionizing voltage between the point and the charging plate to provide a stream of gaseous ions within said expansion chamber upon which the condensing vapor can form as a charged aerosol, a collector tube down stream of said nozzle outlet having a rod shaped charge collector mounted longitudinally therein, said rod being axially disposed in the path of said aerosol to receive and discharge the aerosol, and an electrical load to receive the converted electrical power.

10. A power conversion device comprising a central conduit, a source of a condensable vapor under pressure connected to the central conduit, an external conduit and concentric therewith, a source of cooling gas at a temperature below said vapor connected to the external conduit, a nozzle spaced from the end of said conduits into which said vapor and gas are directed and admixed, means for maintaining an ion current upstream of said nozzle to form and charge an aerosol and a charge collector downstream of the nozzle for converting the kinetic power of said charged aerosol into electrical power.

11. A device according to claim 9 in which the charge collector is maintained at a potential slightly less than the maximum potential of the space charge field.

12. A power transducer for converting the internal heat power of a moving gas to electrical power comprising a nozzle for directing a gas containing a condensable vapor therein at a suitable velocity, an expansion chamber, a throat and an outlet on said nozzle said expansion chamber receiving said gas and vapor and cooling said vapor below its condensation temperature, means for providing a stream of ions within said expansion chamber upon which the condensing vapor can form as a charged aerosol, a conversion space at the outlet of said nozzle, means to establish a repelling electrical space-charge field within the conversion space, and means in the conversion space to receive and discharge the charged aerosol whereby the internal heat power of the charged aerosol is converted into electrical power.

13. A power transducer according to claim 12 in which the nozzle is formed from at least two spaced air foil members transversely carried within the gas receiving conduit and the ion providing means comprises spaced wires disposed in the path of the charged aerosol.

14. A charged aerosol power transducer according to claim 12 in which the gas is a low molecular weight gas, the vapor is an electron absorbing vapor and the charged aerosol droplets have a radius of at least 200 A.

15. A charged aerosol power transducer according to claim 12 in which the gas is hydrogen, the vapor is an electron absorbing vapor and is present in an amount less than 10% of the total gas mass and the charged aerosol droplets have a radius of at least 200 A.

16. A charged aerosol power transducer according to claim 12 in which the gas is helium, the vapor is an electron absorbing vapor and is present in an amount less than 10% of the total gas mass and the charged aerosol droplets have a radius of at least 200 A.

17. A charged aerosol power transducer according to claim 12 in which the gas is a low molecular weight gas and is selected from the class comprising hydrogen and helium, the vapor is an electron absorbing vapor, and the charged aerosol droplets have a radius of at least 200 A.

18. A charged aerosol power transducer according to claim 12 in which the gas is a low molecular weight gas, the vapor is an electron absorbing vapor selected from the class comprising vapors of water, alcohol, ketone, glycerol, Freon 72, diphenyl chloride and formamide, and the charged aerosol droplets have a radius of at least 200 A.

19. A charged aerosol power transducer according to claim 14 in which the density parameter is between 0.1 and 2, one velocity parameter is between 1 and 5 and the friction parameter is between 0.007 and 1.

20. A charged aerosol power transducer according to claim 13 in which the effective $(L/D)$ of the transducer is not more than 1, the gas is of low mean molecular weight relative to air of the order of 0.1 and has a sonic velocity under standard conditions in excess of 1000 m./s. and does not exceed 600 m./s. in the converter space and in which the relative gas breakdown factor is greater than 1 and the relative gas density exceeds 5.

References Cited

UNITED STATES PATENTS 3,225,225 12/1965 Wattendorf et al. ------ 310—6

J. D. MILLER, *Primary Examiner.*

D. X. SLINEY, *Assistant Examiner.*

U.S. Cl. X.R.

310—11